US00RE45367E

(19) United States
(12) Reissued Patent
Gorsuch et al.

(10) Patent Number: US RE45,367 E
(45) Date of Reissued Patent: Feb. 10, 2015

(54) PROTOCOL CONVERSION AND BANDWIDTH REDUCTION TECHNIQUE PROVIDING MULTIPLE NB+D ISDN BASIC RATE INTERFACE LINKS OVER A WIRELESS CODE DIVISION MULTIPLE ACCESS COMMUNICATION SYSTEM

(75) Inventors: Thomas E. Gorsuch, Merritt Island, FL (US); Carlo Amalfitano, Melbourne Beach, FL (US)

(73) Assignee: Intel Corporation, Santa Clara, CA (US)

(21) Appl. No.: 12/788,716

(22) Filed: May 27, 2010

Related U.S. Patent Documents

Reissue of:
(64) Patent No.: 6,151,332
Issued: Nov. 21, 2000
Appl. No.: 08/992,759
Filed: Dec. 17, 1997

U.S. Applications:
(60) Provisional application No. 60/050,277, filed on Jun. 20, 1997, provisional application No. 60/050,338, filed on Jun. 20, 1997.

(51) Int. Cl.
*H04J 3/16* (2006.01)

(52) U.S. Cl.
USPC ..... 370/466; 370/335; 370/342; 370/465; 370/468; 370/469; 370/522; 370/524; 370/249; 375/130

(58) Field of Classification Search
None
See application file for complete search history.

(56) References Cited

U.S. PATENT DOCUMENTS

| | | | | |
|---|---|---|---|---|
| 4,107,469 | A | 8/1978 | Jenkins | |
| 4,577,316 | A | 3/1986 | Schiff | |
| 4,625,308 | A | 11/1986 | Kim et al. | |
| 4,675,863 | A | 6/1987 | Paneth et al. | 370/50 |
| 4,817,089 | A | 3/1989 | Paneth et al. | 370/95 |
| 4,841,526 | A | 6/1989 | Wilson et al. | |
| 4,862,453 | A | 8/1989 | West et al. | |
| 4,866,709 | A | 9/1989 | West et al. | |
| 4,912,705 | A | 3/1990 | Paneth et al. | 370/95.1 |
| 4,949,395 | A | 8/1990 | Rydbeck | |
| 5,022,024 | A | 6/1991 | Paneth et al. | 370/50 |

(Continued)

FOREIGN PATENT DOCUMENTS

| | | |
|---|---|---|
| DE | 4426183 | 10/1995 |
| DE | 19907085 | 4/2000 |

(Continued)

OTHER PUBLICATIONS

Melanchuk et al., "CDPD and Emerging Digital Cellular Systems," digest of Papers of COMPCN, Computer Society conference 1996, Santa Clara, CA, No. CONF. 41, Feb. 25, 1996, pp. 2-8, XP000628458.

(Continued)

*Primary Examiner* — Steven H Nguyen
(74) *Attorney, Agent, or Firm* — Blakely, Sokoloff, Taylor & Zafman LLP

(57) ABSTRACT

A technique for integrating services digital network (ISDN) and code division multiple access (CDMA) or other digital wireless communication protocols by a technique that strips off lower protocol layers, such as layers one and two of the ISDN protocol and sending only layer three and above messages over a more efficient wireless protocol.

33 Claims, 4 Drawing Sheets

(56) References Cited

U.S. PATENT DOCUMENTS 5,027,348 A 6/1991 Curry
5,027,400 A 6/1991 Baji et al.
5,114,375 A 5/1992 Wellhausen et al. ..... 446/246
5,115,309 A 5/1992 Hang
5,226,044 A 7/1993 Gupta et al.
5,268,900 A 12/1993 Hluchyj et al.
5,282,222 A 1/1994 Fattouche et al. ..... 375/1
5,323,502 A 6/1994 Miller
5,325,419 A 6/1994 Connolly et al. ..... 379/60
5,355,374 A 10/1994 Hester et al.
5,369,637 A 11/1994 Richardson et al.
5,373,502 A 12/1994 Turban
5,375,124 A 12/1994 D'Ambrogio et al.
5,388,102 A 2/1995 Griffith et al. ..... 370/512
5,394,473 A 2/1995 Davidson
5,412,429 A 5/1995 Glover ..... 348/398
5,442,625 A 8/1995 Gitlin et al.
5,463,629 A 10/1995 Ko
5,471,463 A 11/1995 Hulbert
5,544,156 A 8/1996 Teder et al.
5,546,382 A * 8/1996 Fujino ..... 455/405
5,585,850 A 12/1996 Schwaller ..... 348/388
5,586,113 A 12/1996 Adachi et al.
5,590,156 A 12/1996 Carney
5,592,470 A 1/1997 Rudrapatna et al.
5,592,471 A 1/1997 Briskman
5,594,782 A 1/1997 Zicker et al.
5,603,081 A 2/1997 Raith et al.
5,606,580 A 2/1997 Mourot et al.
5,617,423 A 4/1997 Li et al. ..... 370/426
5,642,348 A 6/1997 Barzegar et al.
5,655,001 A 8/1997 Cline et al. ..... 370/328
5,657,358 A 8/1997 Paneth et al. ..... 375/356
5,663,958 A 9/1997 Ward
5,663,990 A 9/1997 Bolgiano et al.
5,673,259 A 9/1997 Quick, Jr.
5,687,194 A 11/1997 Paneth et al. ..... 375/283
5,697,059 A 12/1997 Carney ..... 455/34.1
5,699,364 A 12/1997 Sato et al.
5,708,656 A 1/1998 Noneman et al.
5,729,541 A 3/1998 Hamalainen et al.
5,734,646 A 3/1998 I et al.
5,748,624 A * 5/1998 Kondo ..... 370/347
5,774,460 A 6/1998 Schiffel et al.
5,781,542 A 7/1998 Tanaka et al.
5,784,406 A 7/1998 DeJaco et al.
5,790,551 A 8/1998 Chan
5,793,744 A 8/1998 Kanerva et al.
5,802,465 A 9/1998 Hamalainen et al.
5,809,415 A 9/1998 Rossmann
5,825,807 A 10/1998 Kumar
5,828,659 A 10/1998 Teder et al.
5,828,662 A 10/1998 Jalali et al.
5,844,894 A 12/1998 Dent
5,845,211 A 12/1998 Roach, Jr. ..... 455/436
5,854,786 A 12/1998 Henderson et al. ..... 370/335
5,856,971 A 1/1999 Gitlin et al.
5,859,840 A 1/1999 Tiedemann, Jr. et al.
5,859,879 A 1/1999 Bolgiano et al.
5,872,786 A 2/1999 Shobatake
5,881,060 A 3/1999 Morrow et al.
5,896,376 A 4/1999 Alperovich et al.
5,905,719 A * 5/1999 Arnold et al. ..... 370/330
5,910,945 A 6/1999 Garrison et al.
5,914,950 A 6/1999 Tiedemann, Jr. et al.
5,923,650 A 7/1999 Chen et al.
5,930,230 A 7/1999 Odenwalder et al.
5,946,356 A 8/1999 Felix et al.
5,950,131 A 9/1999 Vilmur
5,956,332 A 9/1999 Rasanen et al.
5,966,374 A 10/1999 Rasanen
5,991,279 A 11/1999 Haugli et al.
6,001,800 A 12/1999 Mehta et al.
6,002,690 A 12/1999 Takayama et al.
6,005,855 A 12/1999 Zehavi et al.
6,009,106 A 12/1999 Rustad et al.
6,011,800 A 1/2000 Nadgauda et al.
6,023,474 A 2/2000 Gardner et al.
6,028,853 A 2/2000 Haartsen
6,028,868 A 2/2000 Yeung et al.
6,031,832 A * 2/2000 Turina ..... 370/348
6,052,385 A 4/2000 Kanerva et al.
6,058,104 A * 5/2000 Snelling et al. ..... 370/277
6,064,678 A 5/2000 Sindhushayana et al.
6,069,883 A 5/2000 Ejzak et al.
6,078,572 A 6/2000 Tanno et al.
6,081,536 A 6/2000 Gorsuch et al.
6,088,335 A 7/2000 I et al.
6,097,722 A * 8/2000 Graham et al. ..... 370/395.21
6,097,733 A * 8/2000 Basu et al. ..... 370/468
6,111,863 A 8/2000 Rostoker et al.
6,112,092 A 8/2000 Benveniste
6,134,233 A 10/2000 Kay
6,151,332 A 11/2000 Gorsuch et al.
6,157,619 A 12/2000 Ozluturk et al.
6,161,013 A 12/2000 Anderson et al.
6,181,683 B1 1/2001 Chevillat et al.
6,185,196 B1 2/2001 Mademann
6,195,362 B1 2/2001 Darcie et al.
6,198,723 B1 3/2001 Parruck et al.
6,198,728 B1 * 3/2001 Hulyalkar et al. ..... 370/310.1
6,208,871 B1 3/2001 Hall et al.
6,215,798 B1 4/2001 Carneheim et al.
6,222,828 B1 4/2001 Ohlson et al.
6,236,647 B1 5/2001 Amalfitano
6,243,372 B1 6/2001 Petch et al.
6,249,681 B1 * 6/2001 Virtanen ..... 455/466
6,259,683 B1 7/2001 Sekine et al.
6,262,980 B1 7/2001 Leung et al.
6,269,088 B1 7/2001 Masui et al.
6,272,168 B1 8/2001 Lomp et al.
6,285,665 B1 9/2001 Chuah
6,307,840 B1 10/2001 Wheatley, III et al.
6,310,859 B1 10/2001 Morita et al.
6,335,922 B1 1/2002 Tiedemann, Jr. et al.
6,366,570 B1 4/2002 Bhagalia
6,370,117 B1 4/2002 Koraitim et al.
6,373,830 B1 4/2002 Ozluturk
6,373,834 B1 4/2002 Lundh et al.
6,377,548 B1 4/2002 Chuah
6,377,809 B1 4/2002 Rezaiifar et al.
6,388,999 B1 5/2002 Gorsuch et al.
6,389,000 B1 5/2002 Jou
6,396,804 B2 5/2002 Odenwalder
6,418,148 B1 7/2002 Kumar et al.
6,456,608 B1 9/2002 Lomp
6,469,991 B1 10/2002 Chuah
6,473,623 B1 10/2002 Benveniste
6,504,830 B1 1/2003 Östberg et al.
6,519,651 B1 2/2003 Dillon
6,526,039 B1 2/2003 Dahlman et al.
6,526,064 B1 2/2003 Bousquet
6,526,281 B1 2/2003 Gorsuch et al.
6,532,365 B1 3/2003 Anderson et al.
6,542,481 B2 4/2003 Foore et al.
6,545,986 B1 4/2003 Stellakis
6,567,416 B1 5/2003 Chuah
6,570,865 B2 5/2003 Masui et al.
6,571,296 B1 5/2003 Dillon
6,574,211 B2 6/2003 Padovani et al.
6,597,913 B2 7/2003 Natarajan
6,845,104 B2 1/2005 Johnson et al.
6,973,140 B2 12/2005 Hoffman et al.
7,054,293 B2 5/2006 Tiedemann et al.
2004/0160910 A1 8/2004 Gorsuch et al.
2004/0180696 A1 9/2004 Foore et al.

FOREIGN PATENT DOCUMENTS

EP 443061 8/1991
EP 0 526 106 A2 2/1993
EP 526106 2/1993
EP 635949 1/1995
EP 0 682 423 A2 11/1995

(56) References Cited

FOREIGN PATENT DOCUMENTS

| | | |
|---|---|---|
| EP | 682423 | 11/1995 |
| EP | 682426 | 11/1995 |
| EP | 0 719 062 A2 | 6/1996 |
| EP | 719062 | 6/1996 |
| FR | 2761557 | 1/1998 |
| GB | 2243973 | 11/1991 |
| JP | 5-167609 | 7/1993 |
| JP | 7-107546 | 9/1993 |
| JP | 8-140143 | 11/1994 |
| JP | 7-303093 | 4/1995 |
| JP | 8-097824 | 4/1996 |
| JP | 8-316966 | 11/1996 |
| JP | 9-55764 | 2/1997 |
| JP | 2000-236343 | 8/2000 |
| JP | 2000-286851 | 10/2000 |
| JP | 2002-51044 | 4/2002 |
| JP | 2002-510447 | 4/2002 |
| KR | 1996-0016201 | 5/1996 |
| KR | 1997-0001857 | 2/1997 |
| SU | 1401626 | 6/1988 |
| SU | 1837403 | 8/1993 |
| WO | 93/21719 | 10/1993 |
| WO | 95/07578 | 3/1995 |
| WO | 95/08900 | 3/1995 |
| WO | 96/08934 | 3/1996 |
| WO | 96/37081 | 11/1996 |
| WO | 96/27994 | 12/1996 |
| WO | 97/32412 | 4/1997 |
| WO | 97/23073 | 6/1997 |
| WO | 97/36405 | 10/1997 |
| WO | 97/46044 | 12/1997 |
| WO | 98/59447 | 12/1998 |
| WO | 98/59523 | 12/1998 |
| WO | 99/44341 | 9/1999 |
| WO | 99/63713 | 12/1999 |

OTHER PUBLICATIONS

3rd Generation Partnership Project; Technical Specification Group Radio Access Network; MAC protocol specification (3GPP TS 25.321 version 3.6.0 Release 1999).

3rd Generation Partnership Project; Technical Specification Group Radio Access Network; Multiplexing and channel coding (FDD) (3GPP TS 25.212 version 3.5.0 Release 1999).

3rd Generation Partnership Project; Technical Specification Group Radio Access Network; Physical channels and mapping of transport channels onto physical channels (FDD) (3GPP TS 25.211 version 3.5.0 Release 1999).

3rd Generation Partnership Project; Technical Specification Group Radio Access Network; Spreading and modulation (FDD) (3GPP TS 25.213 version 3.4.0 Release 1999).

3rd Generation Partnership Project; Technical Specification Group Radio Access Network; UTRAN Iub Interface User Plane Protocols for Common Transport Channel Data Streams (3GPP TS 25.435 version 3.5.0 Release 1999).

3rd Generation Partnership Project; Technical Specification Group Radio Access Network; Radio Interface Protocol Architecture (3GPP TS 25.301 version 3.6.0 Release 1999).

3rd Generation Partnership Project; Technical Specification Group Services and System Aspects; QoS Concept and Architecture (3GPP TS 23.107 version 3.5.0 Release 1999).

Andermo et al., "Code Division Testbed, CODIT," IEEE International Conference on Universal Personal Communications, vol. 1, pp. 397-401 (Oct. 12-15, 1993).

Andermo et al., "CODIT and Third Generation Systems," 4$^{th}$ IEEE International Conference on Universal Personal Communications Record, pp. 843-847 (Nov. 6-10, 1995).

Andermo et al., "CODIT, a Testbed Project Evaluating DS-CDMA for UMTS/FPLMTS," IEEE 44$^{th}$ Vehicular Technology Conference, vol. 1, pp. 21-25 (Jun. 8-10, 1994).

Andermo, "Overview of CODIT Project," Proceedings of the RACE Mobile Telecommunications Summit, pp. 33-42 (Nov. 1995).

Attachment 2, *High Speed Data RLP* Lucent Technologies, Version 0.1, Jan. 16, 1997.

Azad et al., Multirate Spread Spectrum Direct Sequence CDMA Techniques, 1994, The Institute of Electrical Engineers.

Bell Labs Technical Journal, Lucent Technologies, vol. 2, No. 3, Summer 1997.

Brismark et al., "A Coherent Detection Scheme for the Uplink Channel in a CDMA System," 1994 IEEE 44th Vehicular Technology Conference, Stockholm, Sweden, vol. 2, pp. 729-732 (Jun. 1994).

Budka et al., Cellular Digital Packet Data Networks, Bell Labs Technical Journal, Summer 1997, pp. 164-181.

Cellular Digital Packet Data, System Specification, Release 1.1, Jan. 19, 1995.

Chih-Lin I et al., IS-95 Enhancements for Multimedia Services, Bell Labs Technical Journal, pp. 60-87, Autumn 1996.

Chih-Lin I et al., Load and Interference Based Demand Assignment (LIDA) for Integrated Services in CDMA Wireless Systems, Nov. 18, 1996, pp. 235-241.

Chih-Lin I et al., Multi-Code CDMA Wireless Personal Communications Networks, Jun. 18, 1995.

Chih-Lin I et al., Performance of Multi-Code CDMA Wireless Personal Communications Networks, Jul. 25, 1995.

Chih-Lin I et al., Variable Spreading Gain CDMA with Adaptive Control for True Packet Switching Wireless Network, 1995, pp. 725-730.

Chung, Packet Synchronization and Identification for Incremental Redundancy Transmission in FH-CDMA Systems, 1992, IEEE, pp. 292-295.

CODIT Final Review Report, Issue 2.0 (Nov. 21, 1995).

Data Service Options for Wideband Spread Spectrum Systems, TIA/EIA Interim Standard. TIA/EIA/IS-707, Feb. 1998.

*Data Service Options for Wideband Spread Spectrum Systems.* TIA/EIA Interim Standard. TIA/EIA/IS-707-A. Apr. 1999.

Data Service Options for Wideband Spread Spectrum Systems: Introduction, PN-3676. 1 (to be published as TIA/EIA/IS-707.1), Mar. 20, 1997 (Content Revision 1).

*Data Services Option Standard for Wideband Spread Spectrum Digital Cellular System.* TIA/EIA/IS-99. TIA/EIA Interim Standard. Jul. 1995.

*Data Services Options Standard for Wideband Spread Spectrum Systems: Packet Data Services. PN-3676.5 (to be published as TIA/EIA/IS-707.5) Ballot Version,* May 30, 1997.

Data Standard, Packet Data Section, PN-3676.5 (to be published as TIA/EIA/IS-DATA.5), Dec. 8, 1996, Version 02 (Content Revision 03).

Draft Text for "*95C" Physical Layer (Revision 4), Part 1, Document #531-981-20814-95C, Part 1 on 3GPP2 website (ftp://ftp.3gpp2.org/tsgc/working/1998/1298_Maui/WG3-TG1/531-98120814-95c,%20part%201.pdf, 1998).

Draft Text for "95C" Physical Layer (Revision 4), Part 2, Document #531-981-20814-95C, part 2 on 3GGP2 website (ftp://ftp.3gpp2.org/tsgc/working/1998/1298_Maui/WG3-TG1/531-98120814-95c,%20part%202.pdf, 1998).

Ejzak et al., Lucent Technologies Air Interface Proposal for CDMA High Speed Data Service, Revision 0.1, May 5, 1997.

Ejzak et al., Lucent Technologies Air Interface Proposal for CDMA High Speed Data Service, Apr. 14, 1997.

Ejzak, et al. *Proposal for High Speed Packet Data Service, Version 0.1.* Lucent Technologies, Jan. 16, 1997.

Elhakeem, Congestion Control in Signalling Free Hybrid ATM/CDMA Satellite Network, IEEE, 1995, pp. 783-787.

"GSM 03.64 v2.1.1 Overall description of the GPRS radio interface; Stage 2", TDoc SMG 360 /97, Meeting #22, Kristiansand, Norway, Jun. 9-13, 1997.

Hall et al., Design and Analysis of Turbo Codes on Rayleigh Fading Channels, IEEE Journal on Selected Areas in Communications, vol. 16, No. 2, Feb. 1998, pp. 160-174.

High Data Rate (HDR) Solution, Qualcomm, Dec. 1998.

High Data Rate (HDR), cdmaOne optimized for high speed, high capacity data, Wireless Infrastructure, Qualcomm, Sep. 1998.

(56) References Cited

OTHER PUBLICATIONS

Hindelang et al., Using Powerful "Turbo" Codes for 14.4 Kbit/s Data Service in GSM or PCS Systems, IEEE Global Communications Conference, Phoenix, Arizona, USA, Nov. 3-8, 1997, vol. II, pp. 649-653.
Honkasalo, Harri. *High Speed Data Air Interface.* 1996.
Ibe, "Networks and Remote Access. Protocols, Problems, and Solutions," DMK Publishers, p. 56 (2002).
*Introduction to cdma2000 Spread Spectrum Systems, Release C.* TIA/EIA Interim Standard. TIA/EIA/IS-2000.1-C. May 2002.
Kaiser et al., Multi-Carrier CDMA with Iterative Decoding and Soft-Interference Cancellation, Proceedings of Globecom 1997, vol. 1, pp. 523-529.
Knisely, Douglas, N. Telecommunications Industry Association Subcommittee TR-45.5—*Wideband Spread Spectrum Digital Technologies Standards.* Banff, Alberta. Feb. 24, 1997 (TR45.5/97.02.24)21.
Knisely, Douglas, N. Telecommunications Industry Association Subcommittee TR-45.5—*Wideband Spread Spectrum Digital Technologies Standards, Working Group III—Physical Layer.* Banff, Alberta. Feb. 24, 1997 (TR45.5/97.02.24)22.
Knisely, Lucent Technologies Air Interface Proposal for CDMA High Speed Data Service, Jan. 16, 1997.
Krzymien et al., Rapid Acquisition Algorithms for Synchronization of Bursty Transmissions in CDMA Microcellular and Personal Wireless Systems, IEEE Journal on Selected Areas in Communications, vol. 14, No. 3, Apr. 1996, pp. 570-579.
Kumar et al, An Access Scheme for High Speed Packet Data Service on IS-95 based CDMA, Feb. 11, 1997.
Lau et al., A Channel-State-Dependent Bandwidth Allocation scheme for Integrated Isochronous and Bursty Media Data in a Cellular Mobile Information System, IEEE, 2000, pp. 524-528.
Liu et al., Channel Access and Interference Issues in Multi-Code DS-CDMA Wireless Packet (ATM) Networks, Wireless Networks 2, pp. 173-196, 1996.
Lucas, "Synchronisation Procedure in Up and Down-Link in the CoDiT Testbed," RACE Mobile Telecommunications Workshop (May 1994).
Lucent Technologies Presentation First Slide Titled, Summary of Multi-Channel Signaling Protocol, Apr. 6, 1997.
Lucent Technologies Presentation First Slide Titled, Why Support Symmetric HSD (Phase 1C), Feb. 21, 1997.
Mobile Station-Base Station Compatibility Standard for Dual-Mode Wideband Spread Spectrum Cellular System, TIA Interim Standard, TIA/EIA/IS-95-A (Addendum to TIA/EIA/IS-95), May 1995.
Mobile Station-Base Station Compatibility Standard for Dual-Mode Wideband Spread Spectrum Cellular System, TIA/EIA Interim Standard, TIA/EIA/IS-95-A (Revision of TIA/EIA/IS-95), May 1995, pp. 1-742.
Mobile Station-Base Station Compatibility Standard for Wideband Spread Spectrum Cellular Systems, TIA/EIA Standard, TIA/EIA-95-B (Upgrade and Revision of TIA/EIA-95-A), Mar. 1999.
Morris, "UMTS and the Race II CODIT Project," IEEE Colloquium on Mobile Telecommunications Towards the Year 2000, pp. 8/1-8/4 (Oct. 1994).
Motorola, Version 1.0. *Motorola High Speed Data Air Interface Proposal Comparisions and Recommendations.* Jan. 27, 1997.
*MSC-BS Interface (A-Interface) for Public 800 MHz.* TIA/EIA/IS-634-A. TIA/EIA Interim Standard (Revision of TIA/EIA/IS-634) Jul. 1998.
*MSC-BS Interface for Public 800 MHz.*TIA/EIA/IS-634. TIA/EIA Interim Standard, Dec. 1995.
Network Wireless Systems Offer Business Unit (NWS OBU), Feature Definition Document for Code Division Multiple Access (CDMA) Packet Mode Data Services, FDD-1444, Nov. 26, 1996.
Ott, David TR45.5, CDMA WBSS Technical Standards Meeting Summary. Feb. 24-28, 1997 Banff, Alberta.
Packet Data Service Option Standard for Wideband Spread Spectrum Systems, TIA/EIA Interim Standard, TIA/EIA/IS-657, Jul. 1996.
*Physical Layer Standard for cdma2000 Spread Spectrum Systems, Release C.* TIA/EIA Interim Standard. TIA/EIA/IS-2000.2C. May 2002.
Puleston, PPP Protocol Spoofing Control Protocol, Global Village Communication (UK) Ltd., Feb. 1996.
Reed et al., Iterative Multiuser Detection for CDMA with FEC: Near-Single-User Performance, IEEE Transactions on Communications, vol. 46, No. 12, Dec. 1998, pp. 1693-1699.
Salmasi et al., "On the system design aspects of code division multiple access (CMDA) applied to digital cellular and personal communications networks," IEEE VTC Gateway to the Future Technology in Motion, pp. 57-62, IEEE, May 19, 1991.
*Samsung Electronics Co., Ltd.* v. *Interdigital Communications Corporation, et al.,* First Amended Complaint, Civil Action No. 07-167, United States District Court for the District of Delaware, Sep. 14, 2007.
Shacham, et al., "A Selective-Repeat-ARQ Protocol for Parallel Channels and Its Resequencing Analysis," IEEE Transactions On Communications, XP000297814, 40 (4): 773-782 (Apr. 1992).
Simpson, W. (Editor). "RFC 1661—The Point-to-Point Protocol (PPP)." Network Working Group, Jul. 1994, pp. 1-35. http://www.faqs.org/rfcs/rfc1661.html.
Simpson, W. (Editor). "RFC 1662—PPP in HDLC-Like Framing." Network Working Group, Jul. 1994, pp. 1-17. http://www.faqs.org/rfcs/rfc1662.html.
Skinner et al., Performance of Reverse-Link Packet Transmission in Mobile Cellular CDMA Networks, IEEE, 2001, pp. 1019-1023.
Stage 1 Service Description for Data Services—High Speed Data Services (Version 0.10) CDG RF 38. Dec. 3, 1996.
*Support for 14.4 kbps Data Rate and PCS Interaction for Wideband Spread Spectrum Cellular Systems.* TSB74, Dec. 1995. TIA/EIA Telecommunications Systems Bulletin.
*Tantivy Communications, Inc.* v. *Lucent Technologies, Inc.,* Lucent Technologies, Inc.'s Preliminary Invalidity Contentions, Civil Action No. 2:04-CV-79, United States District Court for the Eastern District of Texas, Marshall Division. Dec. 8, 2004.
*Tantivy Communications, Inc.* v. *Lucent Technologies, Inc.,* Markman Order, Civil Action No. 2:04-CV-79, (Aug. 11, 2005).
*Tantivy Communications, Inc.* v. *Lucent Technologies, Inc.,* Plaintiff's Second Amended Complaint, Civil Action No. 2:04-CV-79, United States District Court for the Eastern District of Texas, Marshall Division, Jun. 3, 2005.
*Telecommunications Industry Association Meeting Summary.* Task Group I, Working Group III, Subcommittee TR45.5. Feb. 24-27, 1997. Banff, Alberta.
*Telecommunications Industry Association Meeting Summary.* Task Group I, Working Group III, Subcommittee TR45.5. Jan. 6-8, 1997. Newport Beach, California.
*Upper Layer (Layer 3) Signaling Standard for cdma2000 Spread Spectrum Systems, Release C.* TIA/EIA Interim Standard. TIA/EIA/IS-2000.5-C. May 2002.
Viterbi, "A Constructive (Backward Compatible) Approach for Migration to Wider Band Wireless Services," Qualcomm Incorporated, 3rd Generation Wider Band CDMA Technology Conference (Feb. 25, 1998).
Viterbi, The Path to Next Generation Services with CDMA, Qualcomm Incorporated, 1998 CDMA Americas Congress, Los Angeles, California, Nov. 19, 1998.
Wang et al., The Performance of Turbo-Codes in Asynchronous DS-CDMA, IEEE Global Communications Conference, Phoenix, Arizona, USA, Nov. 3-8, 1997, Gol. III, pp. 1548-1551.
www.cdg.org/news/press/1997.asp. *CDA Press Release Archive,* 1997.
Melanchuk, et al., "CDPD and Emerging Digital Cellular Systems," *Digest of Papers of COMPCON,* Computer Society Conference 1996, Technologies for the Information Superhighway, Santa Clara, CA., No. Conf. 41, pp. 2-8 (Feb. 25, 1996), XP000628458 Institute of Electrical and Electronics Engineers.

* cited by examiner

PROTOCOL CONVERSION AND BANDWIDTH REDUCTION TECHNIQUE PROVIDING MULTIPLE NB+D ISDN BASIC RATE INTERFACE LINKS OVER A WIRELESS CODE DIVISION MULTIPLE ACCESS COMMUNICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION(S)

This application claims the benefit of prior pending U.S. Provisional Application Ser. No. 60/050,277 filed Jun. 20, 1997 entitled "Protocol Conversion And Bandwidth Reduction Technique Providing Multiple nB+D ISDN Basic Rate Interface Links Over a Wireless Code Division of Multiple Access Communication System", and a prior pending U.S. Provisional Application Ser. No. 60/050,338 filed Jun. 20, 1997 entitled "Dynamic Bandwidth Allocation to Transmit a Wireless ISDN Protocol Across a Code Division Multiple Access (CDMA) Radio Link".

BACKGROUND OF THE INVENTION

The increasing use of wireless telephones and personal computers by the general population has led to a corresponding demand for advanced telecommunication services that were once thought to only be meant for use in specialized applications.

For example, in the late 1980's, wireless voice communication such as available with cellular telephony was the exclusive province of the businessman because of relatively high subscriber costs. The same was also true for access to remotely distributed computer networks, whereby until very recently, only business people and large institutions could afford the necessary expensive equipment to access computer networks.

However, the general population now increasingly wishes to not only have access to computer networks such as the Internet and private intranets, but also to have access to such networks in a wireless fashion as well. This is particularly of concern for the users of portable computers, laptop computers, hand-held personal digital assistants, and the like, who would prefer to access such networks without being tethered to a telephone line. There still is no widely available satisfactory solution for providing low cost, high speed access to the Internet and other computer networks using the existing wireless telephone systems such as cellular. This unfortunate situation is most likely an artifact of several circumstances. For example, the typical manner of providing high speed data service in the business environment over the wireline network is not readily adaptable to the voice grade service available in most homes or offices. Such standard high speed data services therefore do not lend themselves well to efficient transmission over standard cellular wireless handsets.

Furthermore, existing cellular network was originally designed only to deliver voice services. At present, the modulation schemes in use continue their focus on delivering voice information with the maximum data rate services in the range of only 9.6 kbps being available. This is because the cellular switching network in most countries, including the United States, uses analog voice channels having a bandwidth from about 300 to 3600 Hertz. Such a low frequency channel does not lend itself directly to transmitting data at rates of 28.8 kilobits per second (kbps) or even 56.6 kbps that is now commonly available using inexpensive wire line modems, and which rates are now thought to be the minimum acceptable data rates for Internet access.

Switching networks with higher speed building blocks are just now coming into use in the United States. Although certain wireline networks, called Integrated Services Digital Networks (ISDN), capable of higher speed data access have been known for a number of years, their costs have only been recently reduced to the point where they are attractive to the residential customer, even for wireline service. Although such networks were known at the time that cellular systems were originally deployed, for the most part, there is no provision for providing ISDN-grade data services over cellular network topologies.

SUMMARY OF THE INVENTION

The present invention provides high speed data and voice service over standard wireless connections via a unique integration of ISDN protocols and existing cellular signaling such as is available with Code Division Multiple Access (CDMA) type digital cellular systems.

The technique consists of establishing a logical connection using a higher layer protocol, such as a network layer protocol, from an ISDN subscriber unit, such as may be connected to a portable computer node, to an intended peer node, such as another computer. The network layer logical connection is made through a wireless channel which provides a physical layer connection between the portable computer node, through a base station, and the intended peer node. In response to relatively low utilization of the wireless channel, the physical layer channel is released while maintaining the appearance of a network layer connection to the higher level protocols.

This has two consequences. First, it frees wireless channel bandwidth for use by other subscriber units, without the overhead associated with having to set up an end to end connection each time that data needs to be transferred. In addition, and perhaps more importantly, by allocating wireless channels only when needed, the bandwidth necessary to provide a temporary but very high speed connection at critical times. These may occur, for example, when a particular subscriber unit requests that a web page file be downloaded from the Internet.

More specifically, the technique, which is here called spoofing, involves stripping off the two lower layers of the ISDN protocol while reformatting layer three and higher layer messages for transmission using a more efficient CDMA based encapsulated protocol.

For example, the network level connection can be maintained by looping back data and removing the sync and maintenance bits at the ISDN physical layer one. Spoofing of the second layer of the ISDN protocol, e.g., the LAPD protocol, is carried out by removing all repetitive protocol elements such as the flag bits from the ISDN data link layer two messages.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF THE INVENTION

Figure 1:
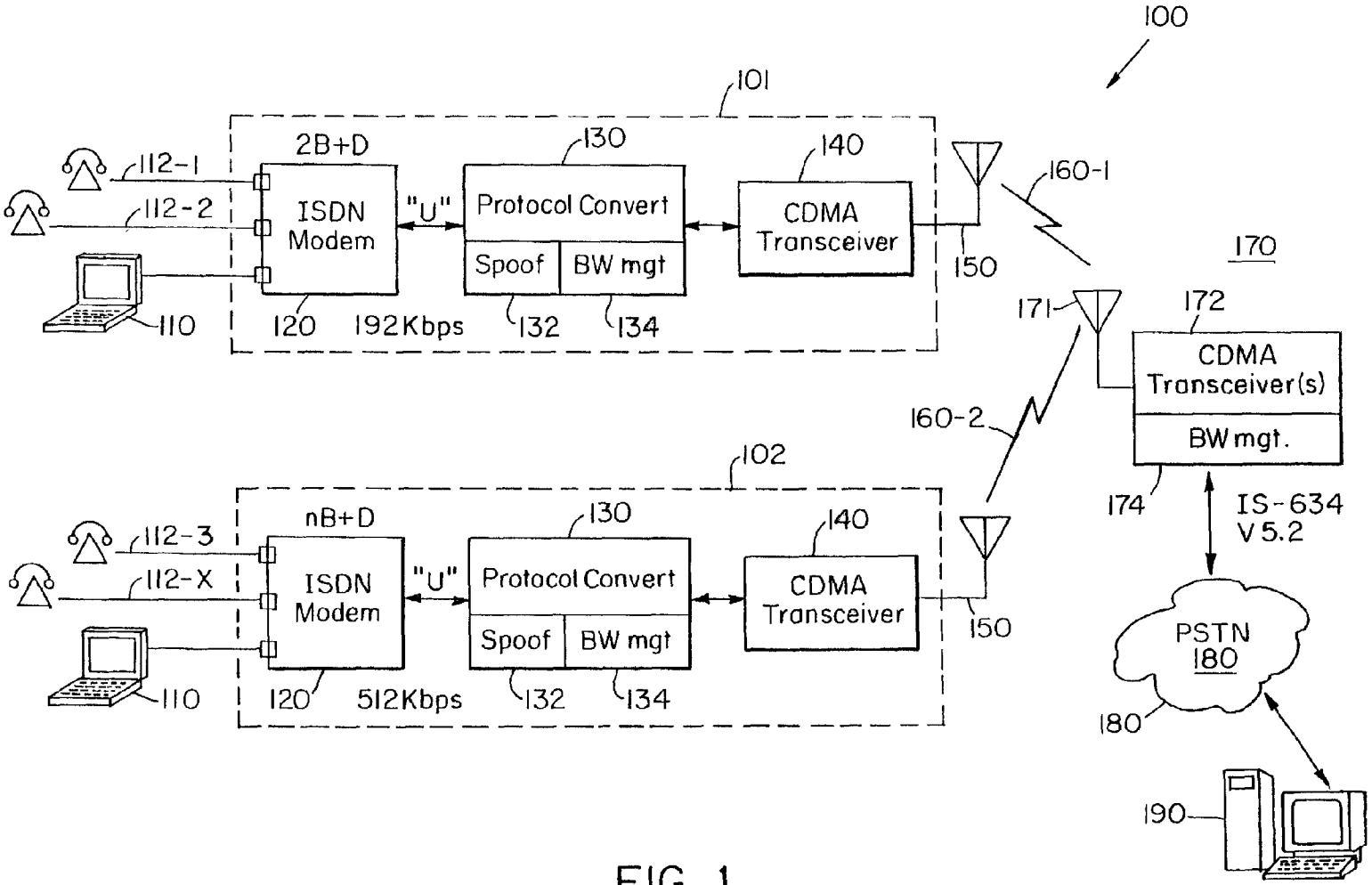
FIG. 1 is a block diagram of a wireless communication system making use of a protocol converter according to the invention.

Turning attention now to the drawings more particularly, FIG. 1 is a block diagram of a system 100 for providing high speed data and voice service over a wireless physical link by seamlessly integrating Integrated Services Digital Network (ISDN) formatted signaling such as received from a standard wireline ISDN modem with the signaling required by a digitally modulated wireless air interface such as Code Division Multiple Access (CDMA).

The system 100 consists of two different types of components, including subscriber units 101a and 101b (collectively 101) and base stations 170. The subscriber units 101 and base stations 170 cooperate to provide the functions necessary in order to achieve the desired implementation of the invention. The subscriber unit 101 provides wireless data services to a portable computing device 110 such as a laptop computer, portable computer, personal digital assistant (PDA) or the like. The base station 170 cooperates with the subscriber unit 101 to permit the transmission of data between the portable computing device 110 and other computing devices 190 such as those connected to the base station 170 either directly or through the Public Switched Telephone Network (PSTN) 180 via the radio channels 160.

More particularly, data and/or voice services are also provided by the subscriber unit 101 to the portable computer 110 as well as one or more other devices such as telephones 112-1, 112-2 (collectively referred to herein as telephones 112. (The telephones 112 themselves may in turn be connected to other modems and computers which are not shown in FIG. 1). In the usual parlance of ISDN, the portable computer 110 and telephones 112 are referred to as terminal equipment (TE). The subscriber unit 101 provides the functions referred to as a network termination type 1 (NT-1). The particular subscriber unit labeled 101a is meant to operate with a so-called basic rate interface (BRI) type ISDN connection that provides two bearer or "B" channels and a single data or "D" channel with the usual designation being 2B+D.

The subscriber unit 101 itself consists of an ISDN modem 120, a device referred to herein as the protocol converter 130 that performs the various functions according to the invention including spoofing 132 and bandwidth management 134, a CDMA transceiver 140, and subscriber unit antenna 150. The various components of the subscriber unit 101 may be realized in discrete devices or as an integrated unit. For example, an existing conventional ISDN modem 120 such as is readily available from any number of manufacturers may be used together with existing CDMA transceivers 140. In this case, the unique functions are provided entirely by the protocol converter 130 which may be sold as a separate device. Alternatively, the ISDN modem 120, protocol converter 130, and CDMA transceiver 140 may be integrated as a single subscriber unit 101.

The ISDN modem 120 converts data and voice signals between the terminal equipment 110 and 112 to format required by the standard ISDN "U" interface. The U interface is a reference point in ISDN systems that designates a point of the connection between the network termination (NT) and the telephone company.

The protocol converter 130 performs spoofing 132 and basic bandwidth management 134 functions, which will be described in greater detail below. In general, spoofing 132 consists of insuring that the subscriber unit 101 appears to the terminal equipment 110, 112 as though it is connected to the public switched telephone network 180 on the other side of the base station 170 at all times. The bandwidth management function 134 is responsible for allocating and deallocating CDMA radio channels 160 as required.

The CDMA transceiver 140 accepts the data from the protocol converter 130 in a particular format and reformats this data in appropriate form for transmission through a subscriber unit antenna 150 over the CDMA radio channels 160-1. Data is then received at the base station 170 and is processed by the base station equipment 172. The base station unit 170 typically consists of one or more base station antennas 171, multiple CDMA transceivers 172, and a bandwidth management functionality 174. The base station 170 couples radio signals to the public switch telephone network 180 in a manner which is well known in the art. The base station 170 may communicate with the PSTN 180 over any number of different efficient communication protocols such as primary rate ISDN, or other LAPD based protocols such as IS-634 or V5.2.

It should also be understood that signals travel bidirectionally, i.e., data signals originate at the portable computer 110 are coupled to the PSTN 180, and data signals received from the PSTN 180 are coupled to the portable computer 110.

Other types of subscriber units such as unit 101b may be used to provide higher speed data services. Such subscriber units 102 typically provide a service referred to as nB+D type service that may use a so-called Primary Rate Interface (PRI) type ISDN protocol with the terminal equipment 110, 112. These units provide a higher speed service such as 512 kbps across the U interface. Operation of the protocol converter 130 and CDMA transceiver 140 are similar for the nB+D type subscriber unit 101b as previously described for subscriber unit 101a with the understanding that the radio links 160-2 to support subscriber unit 102 must either be greater in number or each have a greater bandwidth.

Figure 2:
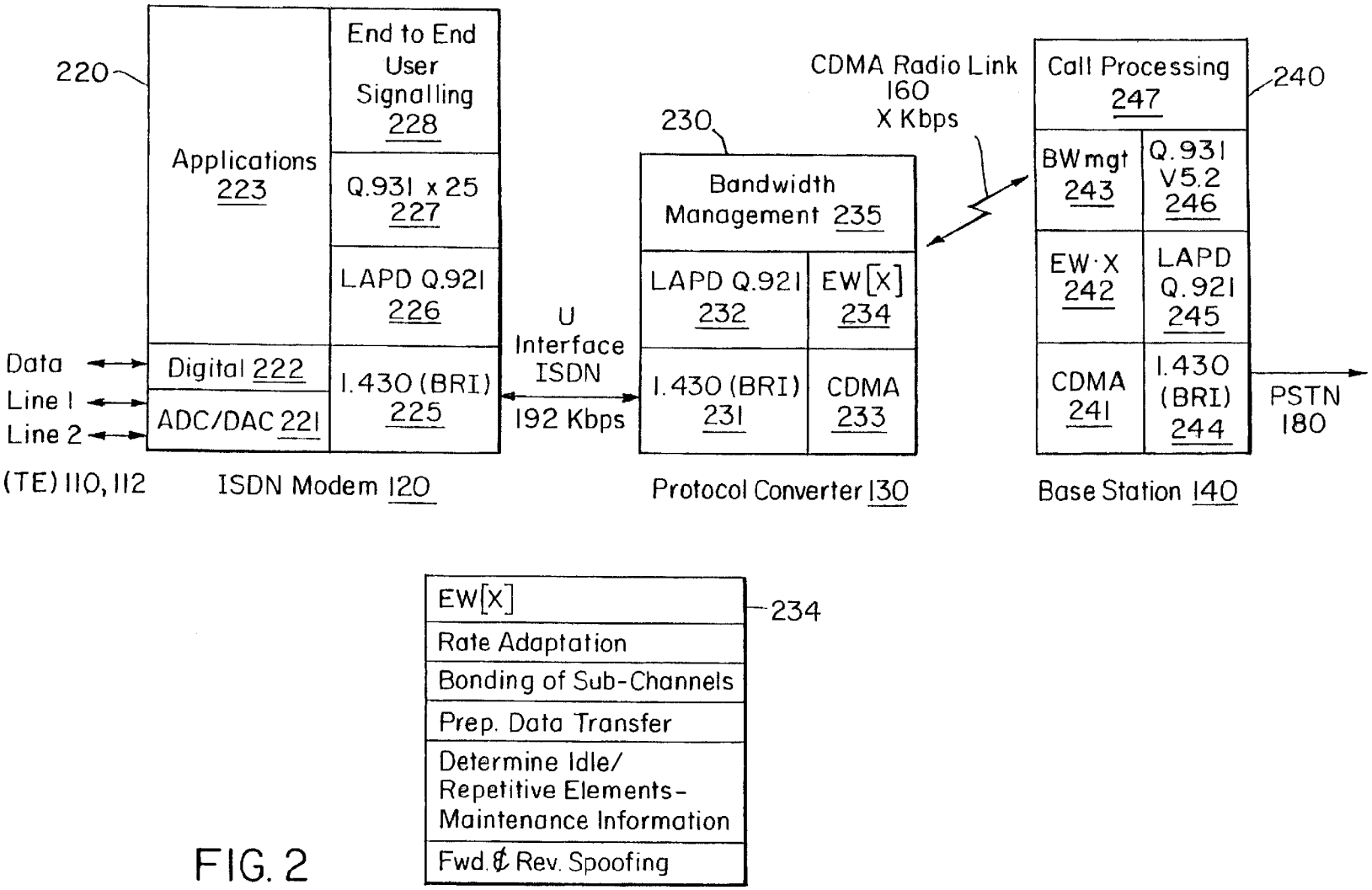
FIG. 2 is an Open Systems Interconnect (OSI) style layered protocol diagram showing the relationship between various protocols used in the invention.

Turning attention now to FIG. 2, the invention may be better understood in the context of a Open Systems Interconnect (OSI) layered protocol model diagram. The three protocol stacks 220, 230, and 240 are for the ISDN modem 120, protocol converter 130, and base station 170, respectively.

The protocol stack 220 used by the ISDN modem 120 is conventional for ISDN communications and includes, on the terminal equipment side, the analog to digital conversion (and digital to analog conversion) 221 and digital data formatting 222 at layer one, and an applications layer 223 at layer two. On the U interface side, the protocol functions include Basic Rate Interface (BRI) such as according to standard 1.430 at layer one, a LAPD protocol stack at layer two, such as specified by standard Q.921, and higher level network layer protocols such as Q.931 or X.227 and high level end to end signaling 228 required to establish network level logical connections.

The lower layers of the protocol stack 220 aggregate two bearer (B) channels to achieve a single 128 kilobits per second data channel in a manner which is well known in the art. Similar functionality can be provided in a primary rate interface such as used by subscriber unit 102 to aggregate multiple B channels to achieve up to 512 kilobits per second data rate over the U interface.

The protocol stack 230 associated with the protocol converter 130 consists of a layer one basic rate interface 231 and a layer two LAPD interface 232 on the U interface side, to match the ISDN modem stack 220. At the next higher network layer, a bandwidth management functionality 235 spans both the U interface side and the CDMA radio link side of the protocol converter stack 230. On the CDMA radio link side 160, the protocols depend upon the particular air interface in use. An efficient wireless protocol, referred to herein as EW[x] 234, encapsulates the layer one 231 and layer two 232 ISDN protocol stacks in such a manner that the terminal equipment 110 may be disconnected from one ore more CDMA radio channels 160 without interrupting the higher network layer connection.

The base station 170 contains the matching CDMA 241 and EW[x] 242 protocols as well as bandwidth management 243. On the PSTN side, the protocols may convert back to basic rate interface 244 and LAPD 245 only include higher level network layer protocols as Q.931 or V5.2 246.

Call processing functionality 247 allows the network layer to set up and tear down radio channels 160 and provide other processing required to support end to end connections between nodes as is known in the art.

The particular invention of interest herein is in the protocol stack 230 associated with the protocol converter 130. In particular, the spoofing function performed by EW[x] 234 include the necessary functions to keep the U interface for the ISDN connection properly maintained, even without the continuous availability of a radio channel 160 of sufficient bandwidth for the duration of the network layer connection. This is necessary because ISDN expects to send and receive a continuous stream of synchronous data bits regardless of whether the terminal equipment at either end actually has any data to transmit. Without the spoofing function 132, radio links 160 of sufficient bandwidth to support at least a 192 kbps data rate would otherwise be required throughout the duration of an end to end network level connection, whether or not data actually needs to be transmitted.

EW[x] 234 therefore involves having the CDMA transceiver 140 loop back continuous synchronous data bits over the ISDN communication path to spoof the terminal equipment 110, 112 into believing that a sufficiently wide wireless communication path 160 is continuously available. However, only when there is actually data present on the terminal equipment to the wireless transceiver 140 does the side bandwidth be allocated. Therefore, unlike the prior art, the network layer need not allocate the assigned wireless bandwidth over the radio channels 160 for the entirety of the network layer communications session. That is, when data is not being transmitted between the portable computer 110 and the remote node bandwidth management function 235 deallocates initially assigned radio channel bandwidth 160 and makes it available for another transceiver and another subscriber unit 101.

Figure 3:
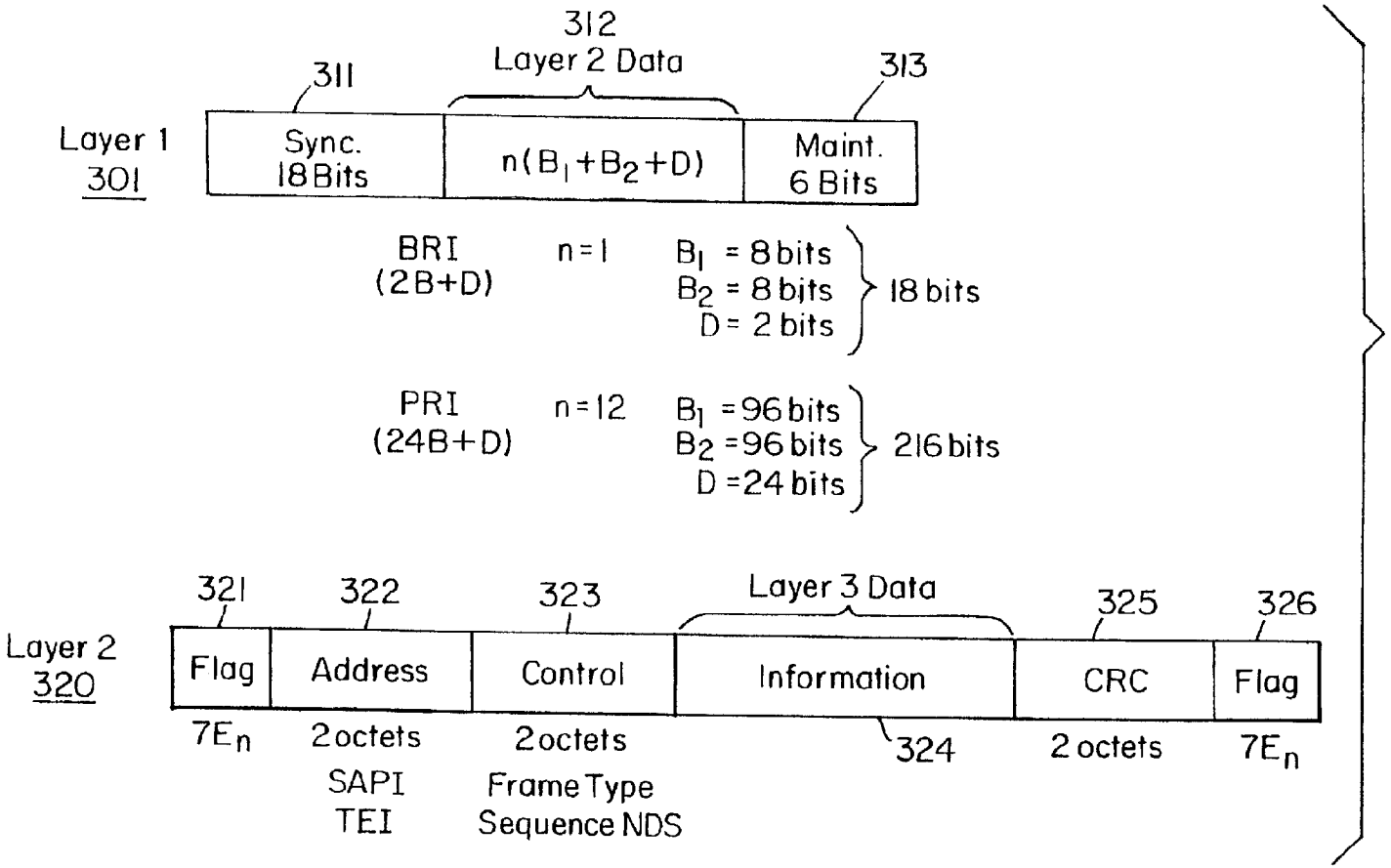
FIG. 3 depicts ISDN layer one and layer two frame formats.

This is accomplished operating on both the ISDN layer one and layer two frames. As shown in FIG. 3, the format of an ISDN layer one frame 310 is shown as including a number of fields such as a sync bit field 311, data field 312, and maintenance bit field 313. The data field 312 includes either 18 bits or 216 bits, depending upon whether the device is a BRI device 101a or PRI type device 101b.

The layer two frame 320 format includes an initial flag field 312, address field 322, control field 323, layer 10 three data field 324, a cyclic redundancy check field 325, one or more terminating flag fields 326. The flag fields typically include the binary patterns 7E (hexadecimal).

The address field 322 identifies service access points and terminal equipment addresses, the control field 323 identifies frame type and sequence numbers, and the cyclic redundancy check field 325 includes checking information as is known in the art. The information field 324 encapsulates information used by layer three.

In accordance with the invention, information specific to layer one and layer two is stripped off by the spoofer 132 so that only layer three information is fed to the CDMA function 323. In addition, the EW[x] protocol 234 loops back all repetitive "echo bits" such as the layer two flag bits 321, 326, and layer one sync and maintenance bits, such as to keep the U interface operating as though the higher level wireless connection was continuously available.

Therefore, only non-repetitive layer three information is sent through the CDMA transceiver, which occurs only during session set up and when actual information must be sent from end to end.

Figure 4:
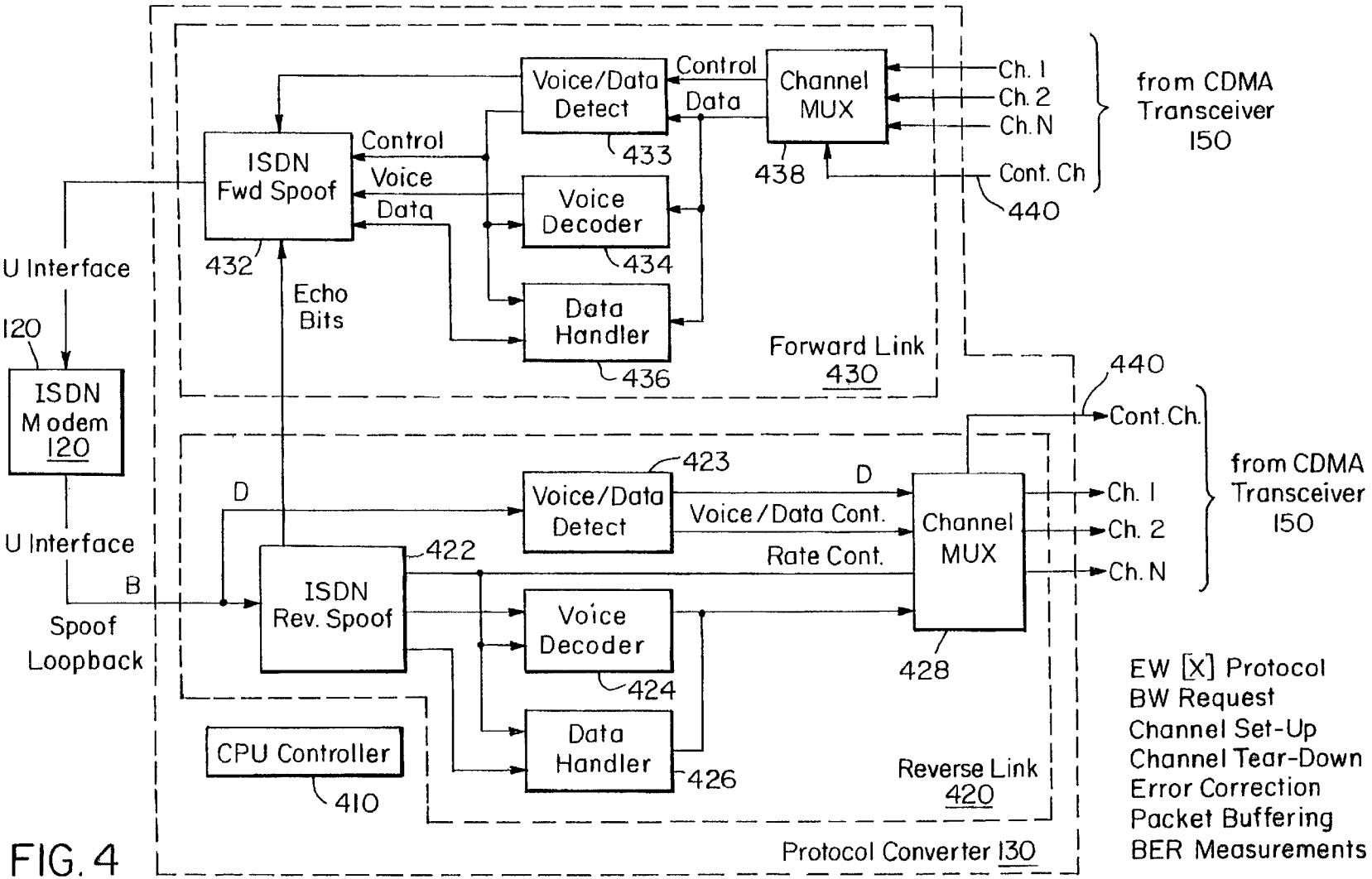
FIG. 4 is a detailed block diagram of the protocol converter which performs spoofing and bandwidth allocation according to the invention.

To understand more fully how this is accomplished, turn now to FIG. 4 which is a more detailed functional diagram of the components of a protocol converter 130. It can be seen that an exemplary protocol converter 130 consists of a microcontroller 410, reverse link processing 420, and forward link processing 430. Reverse link processing 420 further includes ISDN reverse spoofer 422, voice data detector 423, voice decoder 424, packet processor 426, and channel multiplexer 428. The forward link processing 430 contains analogous functions operating in the reverse direction, including a channel multiplexer 438, voice data detector 433, voice decode 434, packet processor 436, and ISDN forward spoofer 432.

In operation, the reverse link 420 first accepts channel data from the ISDN modem 120 over the U interface and forwards it to the ISDN reverse spoofer 432. Any echo bits (e.g., the aforementioned layer one sync bits 311 and maintenance bits 313 as well as layer two flag bits 321, address 322, control 323, and CRC 325 bits) are removed from data received and, once extracted, and sent to the forward spoofer 432. The remaining layer three and higher level bits are thus information that needs to be send over a wireless link.

This extracted data is sent to the voice decoder 424 or packet processor 426, depending upon the type of data being processed.

Any D channel data from the ISDN modem 120 is sent directly to voice data detection 423 for insertion on the D channel inputs to the channel multiplexer 428. The voice data detection circuit 423 determines the content of the D channels by analyzing commands received on the D channel.

D channel commands may also be interpreted to control a class of wireless services provided. For example, the controller 410 may store a customer parameter table that contains information about the customers desired class of service which may include parameters such as maximum data rate and the like. Appropriate commands are thus sent to the channel multiplexer 428 to request one or more required radio channels 160 for communication. Then, depending upon whether the information is voice or data, either the voice decoder 424 or packet processor 426 begins feeding data inputs to the channel multiplexer 428.

It should also be understood that each of the radio channels 160 is not necessarily of a sufficient bandwidth to individually carry an ISDN bandwidth of 56 kbps or even 128 kbps. Rather, in the preferred embodiment, the radio channels 160 are actually rather narrow in bandwidth, such as only sufficiently wide enough to support, say, an 8 kbps data rate. The radio channels 160 are thus allocated to particular network layer connections only upon demand. For more details of a preferred process for allocating radio channels 160, reference should be made to our co-pending U.S. application entitled "Dynamic Bandwidth Allocation to Transmit a Wireless Protocol Across a Code Division Multiple Access (CDMA) Radio Link," Ser. No. 08/992,760, filed on even date herewith and assigned to H.Q. Wireless, Inc., the assignee of this application.

In any event, the channel multiplexer 428 performs the necessary multiplexing of radio channels 160.

The channel multiplexer 428 may make further use of a voice data control signals provided by the voice data detection circuits 423, depending upon whether the information is voice or data.

In addition, the CPU controller 410, operating in connection with the channel multiplexer 428, provides the necessary implementation of the EW[x] protocol between the subscriber unit 101 and the base station 170. For example, radio channel requests, channel setup, and channel tear down commands are sent via commands placed on a control channel 440. These commands are intercepted by the equivalent functionality in the base station 170 to cause the proper allocation of radio frequency channels 160 to particular connections.

The packet processor 426 provides an estimate of the data rate required to the CPU controller 410 so that appropriate commands can be sent over the control channel 440 to allocate an appropriate number of radio channels. The packet processor 426 may also perform packet assembly and buffering of the layer three data into the appropriate format for transmission over the CDMA radio links 160.

The forward link 430 operates in analogous fashion. In particular, signals are first received from the channels 160 by the channel multiplexer 438. In response to receiving information on the control channels 440, control information is routed to the voice data detection circuit 433. Upon a determination that the received information contains data, the received bits are routed to the packet processor 436. Alternatively, the information is voice information, and routed to the voice decoder 434.

Voice and data information are then sent to the ISDN forward spoofer 432 for construction into proper ISDN protocol format. This assembly of information is coordinated with the receipt of echo bits from the ISDN reverse spoofer 422 to maintain the proper expected synchronization on the U interface with the ISDN modem 120.

It can now be seen how an ISDN communication path may be paused even though wireless bandwidth initially allocated for transmission is reassigned to other uses when the ISDN path is idle. In particular, the reverse 422 and forward 432 spoofers cooperate to loop back non-information bearing signals, such as flag patterns, sync bits, and other necessary information, so as to spoof the data terminal equipment connected to the ISDN modem 120 into continuing to operate as though the allocated wireless path over the CDMA transceiver 150 is continuously available.

Therefore, unless there is an actual need to transmit information from the terminal equipment being presented to the channel multiplexers 428, or actual information being received from the channel multiplexers 438, the invention may deallocate initially assigned bandwidth thus making it available for another CDMA transceiver 150 associated with another subscriber unit 101 of the wireless system 100.

The CPU controller 410 may also perform additional functions to implement the EW[x] protocol, including error correction, packet buffering, and bit error rate measurement.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

For example, other digital wireless modulation schemes and services may be used that provide multiple access to a given radio channel, such as frequency division multiple access (FDMA) or time division multiple access (TDMA). However, at the present time FDMA modulation schemes do not appear to be as efficient as CDMA since they may require multiple channel radio frequency circuits to accomplish the same results herein. Furthermore, TDMA protocols may require additional synchronization, especially for the reverse link.

Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. For use with a digital communication network having a first digital communication path for coupling Integrated Services Digital Network (ISDN) communication signals with a first wireless transceiver at a first site, said first wireless transceiver being operative to conduct wireless communications with a second wireless transceiver at a second site, a method of controlling bandwidth utilization of said network comprising [the steps of]:

(a) in response to establishment of a communication session between said first and second sites, controlling said first wireless transceiver to appear to said first digital communication path as though the bandwidth is continuously available during said communication session for wireless communications between said first and second transceivers, irrespective of [the] *a* need to transport ISDN communication signals between said first and second sites; [and]

(b) in the absence of said need to transport ISDN communication signals between said first and second sites, making said bandwidth available for wireless communication by another wireless transceiver of said digital communication network*; and*

*looping back synchronizing and maintenance bits on the IDSN link to spoof an ISDN physical layer protocol.*

2. A method as in claim 1 additionally comprising the step of:

(c) maintaining a connection at a network layer above a data link layer by establishing a lower level connection and using radio frequency bandwidth only when required.

[3. A method as in claim 1 additionally comprising the step of:

looping back synchronizing and maintenance bits on the ISDN link to spoof an ISDN physical layer protocol.]

4. A method as in claim 1 additionally comprising the step of:

looping back an LAPD layer protocol by removing flag bits.

5. For use with a digital communication network having a first digital communication path for coupling data communication signals with a first wireless transceiver at a first site, said first wireless transceiver being operative to conduct wireless communications with a second wireless transceiver at a second site, a method of controlling wireless communication bandwidth comprising [the steps of]:

(a) in response to establishment of a communication session between said first and second sites, controlling said first wireless transceiver to appear to said first digital communication path as though the bandwidth is continuously available during said communication session for wireless communications between said first and second transceivers, irrespective of a need to transport data communication signals between said first and second sites[; and], *wherein the data communication signals include layer two frames including a serial number and a frame type;*

(b) in the absence of said need to transport data communication signals between said first and second sites, making said bandwidth available for wireless communication by another wireless transceiver of said digital communication network*;*

(*c*) *combining, by at least one of the first or second transceiver sites, a plurality of bearer channels onto a single data channel, and allocating a plurality of radio channels based on a required data rate;*

(*d*) *maintaining a connection at a network layer above a data link layer by establishing a lower level connection and using radio frequency bandwidth only when required; and*

(*e*) *looping back a higher layer protocol by removing flag bits*.

[6. A method as in claim 5 additionally comprising the step of:

(c) maintaining a connection at a network layer above a data link layer by establishing a lower level connection and using radio frequency bandwidth only when required.]

7. A method as in claim 5 additionally comprising [the step of:

(d)] *:* (*f*) looping back synchronizing and maintenance bits on the link layer to spoof a physical layer protocol.

[8. A method as in claim 6 additionally comprising the step of:

(e) looping back a higher layer protocol by removing flag bits.]

9. A method as in claim 5 wherein the first and second wireless transceivers use Code Division Multiple Access (CDMA) to conduct wireless communication.

10. A digital communication system comprising:

a first wireless transceiver located at a first site, said first wireless transceiver being coupled to receive data communication signals from a first digital communication path, and being operative to conduct wireless communications:

a second wireless transceiver located at a second site, said second wireless transceiver being operative to conduct wireless communication with said first wireless transceiver;

means for establishing a communication session between said first and second sites, and for controlling said first wireless transceiver to appear to said first digital communication path as though communication bandwidth is continuously available during said communication session for wireless communication between said first and second transceivers, irrespective of a need to transport data communication signals between said first and second sites*, wherein the data communication signals include layer two frames including a serial number and a frame type*;

means for making said bandwidth available for wireless communication by another wireless transceiver of said digital communication network, in the absence of said need to transport data communication signals between said first and second sites; [and]

means for maintaining a connection at a network layer above a data link layer by establishing a lower level connection and using radio frequency bandwidth only when required*, wherein at least one of the first or second wireless transceivers is operable to combine a plurality of bearer channels onto a single data channel and allocate a plurality of radio channels based on a required data rate; and*

*means for looping back synchronizing and maintenance bits on the link layer to spoof a physical layer protocol*.

[11. A system as in claim 10 additionally comprising:

means for looping back synchronizing and maintenance bits on the like layer to spoof a physical layer protocol.]

12. A system as in claim 10 additionally comprising:

means for looping back a higher layer protocol by removing flag bits.

13. A system as in claim 10 wherein the first and second wireless transceivers use Code Division Multiple Access (CDMA) to conduct wireless communication.

*14. A method as in claim 5 further comprising: facilitating use by a code division multiple access (CDMA) transceiver of a CDMA user device of a data traffic channel and a control channel associated with a packet data communication session; and transmitting information indicative of a data rate associated with the data traffic channel on the control channel.*

*15. A method as in claim 5, wherein transported communication signals by at least one of the first or second transceiver sites include address information and cyclic redundancy check.*

*16. A method as in claim 5, wherein the data communication signals include control data, a cyclic redundancy check and data provided by layer 3.*

*17. A method as in claim 5, wherein at least one of the first or second transceiver sites transmits control information including channel set-up requests, channel tear-down request and channel requests.*

*18. A method as in claim 17, wherein the control information is transmitted over a control channel.*

*19. A method as in claim 5, further comprising encapsulating data for transmission in the data communication signals.*

*20. A method as in claim 5, further comprising storing customer class of service data in storage associated with a controller.*

*21. The method of claim 5 wherein the plurality of radio channels are code division multiple access (CDMA) code channels.*

*22. A system as in claim 10 further comprising: a controller configured to control a transceiver of a code division multiple access (CDMA) user device to facilitate use of a data traffic channel and a control channel associated with a packet data communication session and to transmit information indicative of a data rate associated with the data traffic channel on the control channel.*

*23. A system as in claim 10, wherein transported communication signals by at least one of the first or second transceiver sites include address information and cyclic redundancy check.*

*24. A system as in claim 10, wherein the data communication signals include control data, a cyclic redundancy check and data provided by layer 3.*

*25. A system as in claim 10, wherein at least one of the first or second transceiver sites transmits control information including channel set-up requests, channel tear-down request and channel requests.*

*26. A system as in claim 25, wherein the control information is transmitted over a control channel.*

*27. A system as in claim 10, wherein at least one of the first or second wireless transceivers is operable to encapsulate data for transmission in the data communication signals.*

*28. A system as in claim 10, wherein at least one of the first or second wireless transceivers is operable to store customer class of service data in a storage associated with a controller.*

*29. A system as in claim 10 wherein the plurality of radio channels are code division multiple access (CDMA) code channels.*

*30. A digital communication system comprising: a first wireless transceiver located at a first site, said first wireless transceiver to receive data communication signal from a first digital communication path, and being operative to conduct wireless communications;*

*a second wireless transceiver located at a second site, said second wireless transceiver to conduct wireless communication with said first wireless transceiver;*

*a controller to establish a communication session between said first and second sites, and to control said first wireless transceiver to appear to said first digital communication path as though communication bandwidth is continuously available during said communication session for wireless communication between said first and second transceivers, irrespective of a need to transport data communication signals between said first and second sites, wherein the data communication signals include layer two frames including a serial number and a frame type;*

*a bandwidth management device to make said bandwidth available for wireless communication by another wireless transceiver of said digital communication network, in the absence of said need to transport data communication signals between said first and second sites; and*

*the controller to maintain a connection at a network layer above a data link layer by establishing a lower level connection and using radio frequency bandwidth only when required, to loop back a higher layer protocol and to control a transceiver of a code division multiple access (CDMA) user device to facilitate use of a data traffic channel and a control channel associated with a packet data communication session and to transmit information indicative of a data rate associated with the data traffic channel on the control channel, wherein the control channel is not adapted to carry voice or data traffic, and wherein at least one of the first or second wireless transceivers is operable to combine a plurality of bearer channels onto a single data channel and allocate a plurality of radio channels based on a required data rate.*

*31. A system as in claim 30, wherein transported communication signals by at least one of the first or second transceiver sites include address information and cyclic redundancy check.*

*32. A system as in claim 30, wherein the data communication signals include control data, a cyclic redundancy check and data provided by layer 3.*

*33. A system as in claim 30, wherein at least one of the first or second transceiver sites transmits control information including channel set-up requests, channel tear-down request and channel requests.*

*34. A system as in claim 33, wherein the control information is transmitted over a control channel.*

*35. A system as in claim 30, further comprising encapsulating data for transmission in the data communication signals.*

*36. A system as in claim 30, further comprising storing customer class of service data in storage associated with a controller.*

*37. The system of claim 30 wherein the plurality of radio channels are code division multiple access (CDMA) code channels.*

* * * * *